Oct. 20, 1925.  
H. H. BOWDEN  
1,557,973  
PORTABLE LOG SAWING MACHINE  
Filed Nov. 3, 1923  
2 Sheets-Sheet 1

Inventor  
Horace H. Bowden

By  
Attorneys

Oct. 20, 1925.
H. H. BOWDEN
1,557,973
PORTABLE LOG SAWING MACHINE
Filed Nov. 3, 1923  2 Sheets-Sheet 2
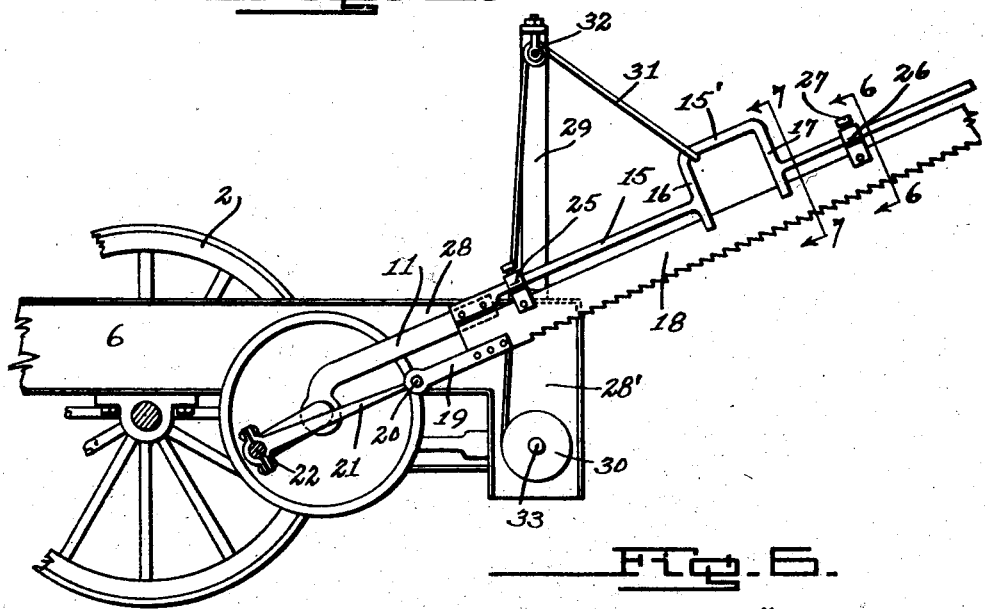
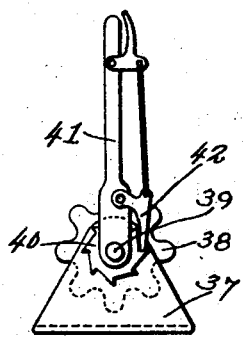
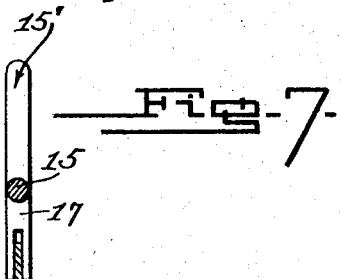
Inventor
Horace H. Bowden.
By
Attorneys Patented Oct. 20, 1925.

1,557,973

UNITED STATES PATENT OFFICE.

HORACE H. BOWDEN, OF PRIOR, MISSOURI.

PORTABLE LOG-SAWING MACHINE.

Application filed November 3, 1923. Serial No. 672,518.

*To all whom it may concern:*

Be it known that I, HORACE H. BOWDEN, citizen of the United States, residing at Prior, in the county of Douglas and State of Missouri, have invented certain new and useful Improvements in Portable Log-Sawing Machines, of which the following is a specification.

This invention relates to a portable log sawing machine and has for its principal object to provide a device which will readily and easily saw logs, timbers or the like into lengths while the wood to be operated upon is supported in a horizontal position.

Another important object of the invention is to provide a portable log sawing machine of the above mentioned character which is of such a construction as to enable the saw to be operated by a suitable motor carried by the machine and the saw may be adjusted in a vertical plane whenever necessary.

A still further object of the invention is to provide a log sawing machine of the above mentioned character, wherein the saw is provided with means for preventing the lateral movement thereof while the same is in operation.

A still further object of the invention is to provide a device of the above mentioned character, which is simple in construction, inexpensive, strong, durable and further well adapted for the purpose for which it is designated.

Other objects and advantages of this invention will become apparent during the course of the following description.

In the accompanying drawings forming a part of this specification and in which like numerals designate like parts throughout the same:—

Figure 3 is a sectional view taken on line 3—3 of Fig. 1.

Figure 4 is a detail view of the ribbed feeding roller and means for actuating the same.

Figure 6 is a transverse sectional view taken on line 6—6 of Fig. 3 and

Figure 7 is a similar view taken on line 7—7 of Fig. 3.

Figure 1:
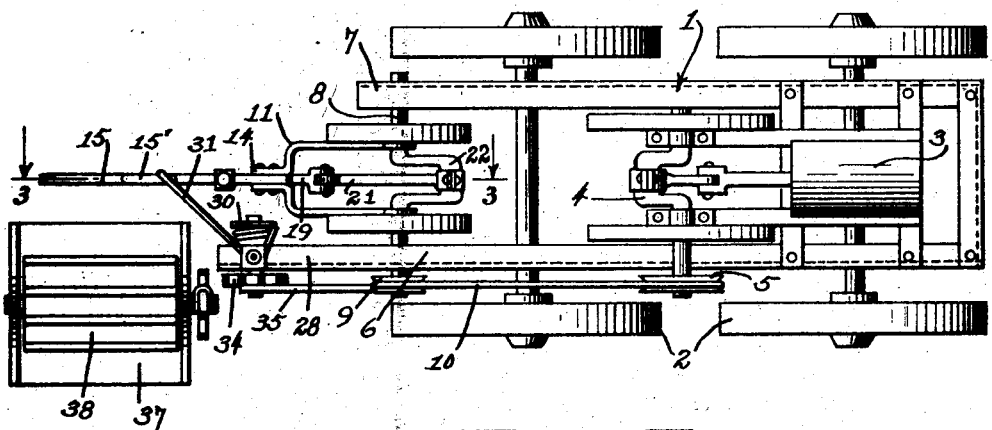
Figure 1 is a plan view of the machine constructed in accordance with the invention.

In the drawings wherein for the purpose of illustration is shown the preferred embodiment of my invention, the numeral 1 designates generally the frame and is supported upon the wheels 2 whereby the device is rendered portable.

Mounted upon the frame 1 centrally thereof is a gasoline motor or engine 3 which is provided with a driving shaft 4 which is horizontally disposed and upon which is mounted the pulley 5. Journaled in the underfaces of the side rails 6 and 7 of the frame 1 and adjacent the forward end thereof is the transversely extending crank shaft 8. The crank shaft 8 has its outer free ends projecting beyond the sides of the frame and a suitable pulley wheel 9 is mounted on one end of said crank shaft for the purpose of receiving the belt 10 which is mounted over the pulley 5 whereby the motor 3 will drive the crank shaft 8 for the purpose hereinafter to be more fully described.

Figure 2:
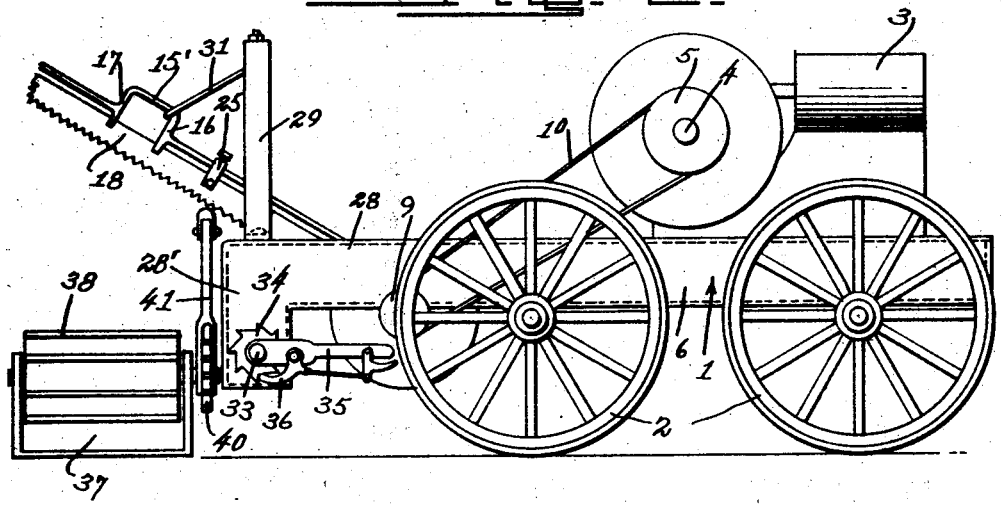
Figure 2 is a side elevation thereof.
Figure 5:
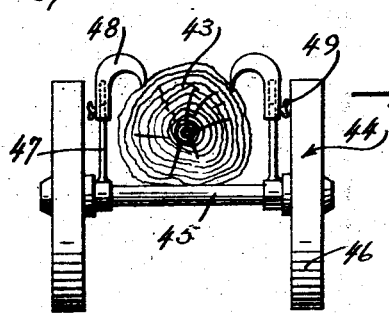
Figure 5 is a detail view of the truck.

A suitable yoke member 11 has its outer free ends secured to the crank shaft 8 whereby the yoke member 11 is pivotally supported upon the crank shaft 8 in the manner as more clearly shown in the drawings. The converging arms of the yoke member 11 provide a suitable sleeve designated by the numeral 14 and carried by the sleeve 14 is the guide member 15. This guide member 15 extends outwardly from the sleeve 14 of the yoke 11 and has its intermediate portion bent upwardly as at 15′ to provide suitable elements 16 and 17 respectively as clearly shown in Figures 2 and 3.

Adapted to be supported in the yoke member 11 and extending through the sleeve 14 provided thereon is the saw blade 18. This saw blade is connected at its rear end to a link 19 which is provided at its outer end with an enlarged bifurcated head 20 and the enlarged head 20 is pivotally connected to the pitman 21 which is clamped to the crank 22 provided in the crank shaft 8 intermediate its ends as shown in Figure 1 of the drawings.

To prevent the saw 18 from swinging in a lateral direction when the saw is being reciprocated through the medium of the crank shaft 8 and the connection therebetween, I provide the detachable clamps 25 and 26 respectively on the upper edge of the saw adjacent the ends thereof and these clamps are adapted to slidably operate on the guide rod 15. Furthermore the stop elements 16 and 17 are so positioned on the guide member 15 as to enable the saw 18 to reciprocate sufficiently so as to enable the same to maintain a relatively straight cutting position and the clamp members 25 and 26 will prevent the lateral movement of the saw blade. I also provide suitable oil cups 27 on the clamps 25 and 26 and these oil cups may be constructed as to provide a means for supplying a lubricant in the proper places at various intervals to prevent the overheating of the contacted surfaces.

For the purpose of permitting the yoke member 11 and the saw blade 18 to be moved in a vertical plane whereby the saw may be swung into an inoperative position when the machine is moved from place to place, I provide an extension 28 on the side rail 6 of the frame 1. The extension is further provided with a downwardly extending portion 28' for the purpose presently to be described. Supported on the extension 28 is a suitable bracket or standard designated by the numeral 29 and a drum 30 is supported in the downwardly extending portion 28'. A suitable cable 31 is attached to the guide member at 15' and passes through a suitable pulley 32 mounted in the standard 29 and is wound around the drum 30. It is to be also understood that the drum 30 is mounted with the shaft 33 and this shaft 33 carries a suitable ratchet wheel 34 on its outer end and a pivoted lever 35 is provided with the pivoted pawl 36 for engagement with the ratchet wheel 34 whereby the drum 30 may be operated for the purpose of winding up the cable 31 so as to cause the yoke member 11, the guide 15 and the saw 18 carried thereby to be moved in a vertical plane to swing the same upwardly and into an inoperative position for the purpose heretofore described.

Supported in a suitable frame 37 located on the ground adjacent the side rail 6 of the frame 1 and disposed transversely thereto and journaled between the sides thereof is the ribbed roller 38. This frame 37 is so arranged with respect to the extension 28 as to be in close proximity to the saw blade 18. The ribbed roller 38 is provided with a ratchet wheel 40 at its outer end and has a pivoted lever 41 which is provided with a pawl 42 for engagement with the ratchet wheel whereby the ribbed roller is caused to be rotated manually. The roller 38 extends longitudinally with relation to the saw blade 18 and is adapted to receive the forward end of the log 43 for the purpose of feeding the same to the saw blade 18.

To support the log 43 in a horizontal position so that the same may be properly cut into the desired lengths by the saw blade 18, I provide an independent carriage designated generally by the numeral 44 and the same comprises an axle 45 upon which is mounted at its outer end wheels 46. The axle 45 also supports the upright rods 47. Slidably supported on the upper ends thereof are the hooks 48, the hooked ends thereof being disposed inwardly. Clamping nuts 49 are provided for holding the hooks 48 in their proper adjusted positions on the rods 47. In use, the carriage 44 is placed in position so as to receive the rear end of the log 43 and the hook members 48 grip the log in such a manner as to prevent the same from moving on the carriage 45 in a sidewise direction. The forward end of the log 43 is then placed upon the ribbed roller 38. The saw blade 18 being swung down into the horizontal position, is then adapted to saw the portion of the log which extends beyond the ribbed roller 38 and the operation of the saw as heretofore described is brought about by the starting of the motor 3 whereby the crank shaft 8 is rotated and the connection between the crank 22 and the saw blade 18 will give the saw blade 18 a reciprocating motion whereby the saw is caused to freely move in the yoke member 11 and be guided upon the guide member 15 and will cut the log into the desired lengths. The lever 41 is operated to cause the ribbed roller 38 to move and thereby feed the log 43 inwardly to the proper position whereby the saw 18 will come into engagement therewith and saw the same. The carriage 44 will move inwardly with the log when the same is fed to the saw blade 18 through the medium of the ribbed roller and thereby support the log in a horizontal position so as to permit the saw blade 18 to properly saw through the log.

It will thus be seen from the foregoing description that a portable log sawing machine has been provided wherein a log may be cut into the desired lengths in a simple and efficient manner whereby considerable time is saved in the handling of various parts for the purposes of adjusting the saw to the log and for supporting the log in a position whereby it will be cut by the saw. Furthermore, the provision of a carriage for the log and the ribbed roller for feeding the same to the saw will enable the log to be sawed more quickly and easily than ordinarily.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to without departing from the spirit or sacrificing any of the principles of the invention.

What I claim as new and desire to secure by Letters Patent is:—

1. In a log sawing machine, a saw guide consisting of a yoke having parallel end portions provided at their extremities with slots, said slots being alined with each other, guide rods connected with the end portion of the yoke at points between the ends of the slots and the intermediate portion of the yoke, said guide rods being disposed beyond the opposite sides of the yoke and alined longitudinally with each other and saw clamps slidably mounted upon the guide rods and located one at each side of the yoke.

2. In a wood sawing machine a saw guide consisting of a yoke having spaced ends provided with alined slots, guide rods carried at the outer sides of the end portion of the yoke and alined with each other and located at points between the inner ends of the slots and the intermediate portion of the yoke, saw clamps slidably mounted upon the guide rods and located one at each side of the yoke, and bracket arms connected with one of the said guide rods at the end thereof and disposed one at each side of the said guide rods the said bracket arms having openings adapted to receive a pivot member.

In testimony whereof I affix my signature.

HORACE H. BOWDEN.